United States Patent [19]

Venners et al.

[11] Patent Number: 4,855,730

[45] Date of Patent: Aug. 8, 1989

[54] COMPONENT AUDIO/VIDEO SYSTEM WITH TIMED CONTROL OF PLURAL PERIPHERAL DEVICES

[75] Inventors: Howard W. Venners, Indianapolis; Billy W. Beyers Jr., Greenfield; James E. Hailey, Indianapolis, all of Ind.

[73] Assignee: RCA Licensing Corporation, Princeton, N.J.

[21] Appl. No.: 48,107

[22] Filed: May 8, 1987

[51] Int. Cl.$^4$ .................... H04Q 9/00; G08C 23/00
[52] U.S. Cl. .................... 340/825.24; 340/825.25; 358/194.1
[58] Field of Search .................... 340/825.06, 825.07, 340/825.22, 825.24, 825.25, 74.1, 33.1; 455/4, 5, 353; 358/181, 188, 194.1, 189, 335; 360/74.1, 33.1

[56] References Cited

U.S. PATENT DOCUMENTS

| | | | |
|---|---|---|---|
| 3,922,641 | 11/1975 | Gates Jr. .................... | 340/825.5 |
| 4,279,012 | 7/1981 | Beckedorff et al. .................... | 340/825.22 |
| 4,337,480 | 6/1982 | Bourassin et al. .................... | 358/93 |
| 4,400,735 | 8/1983 | Strammello Jr. .................... | 358/181 |
| 4,418,333 | 11/1983 | Schwarzbach et al. .................... | 340/825.22 |
| 4,488,179 | 12/1984 | Kruger et al. .................... | 358/181 |
| 4,527,204 | 7/1985 | Kozakai et al. .................... | 360/33.1 |
| 4,581,645 | 4/1986 | Beyers Jr. .................... | 358/181 |
| 4,628,370 | 12/1986 | Fukuoka .................... | 360/15 |
| 4,631,601 | 12/1986 | Brugliera et al. .................... | 358/335 |
| 4,649,428 | 3/1987 | Jones et al. .................... | 358/194.1 |

FOREIGN PATENT DOCUMENTS 0129286 12/1984 European Pat. Off. ..... 340/365 VL

OTHER PUBLICATIONS

R. A. Pitsch, "Dimensia, The Next Dimension of Sight and Sound," RCA Engineer, Jul/Aug. 1985, pp. 66–70.

*Primary Examiner*—Donald J. Yusko
*Assistant Examiner*—Edwin C. Holloway III
*Attorney, Agent, or Firm*—Paul J. Rasmussen; Richard G. Coalter; Peter M. Emanuel

[57] ABSTRACT

A component audio/video system includes a system controller having an input/output port adapted for connection via a bidirectional data bus to a plurality of peripheral audio/video devices. At times determined by a system master clock the controller transmits, via the bidirectional bus, user programmed sequences of commands at user specified times to user selected peripheral devices for controlling the operating modes thereof. After transmission of a command of a sequence, the controller monitors the bus to detect a received return status message from the selected device and in response to the received message selectively (1) re-transmits the last command, (2) interrupts the transmission and (3) transmits a further command in the sequence whereby a number of individual devices may be controlled by a single master clock and the possiblility of conflict between a currently transmitted command and a current device operating mode is minimized.

4 Claims, 2 Drawing Sheets

COMPONENT AUDIO/VIDEO SYSTEM WITH TIMED CONTROL OF PLURAL PERIPHERAL DEVICES

FIELD OF THE INVENTION

This invention relates to home entertainment systems of the type employing component audio and/or audio/video peripheral devices and particularly to systems in which interconnection among various devices is effected by means of a central control unit.

BACKGROUND OF THE INVENTION

A wide variety of audio only and audio/video components is presently commercially available thus giving a user a number of interconnection possibilities to create a home entertainment system personalized to his own particular desires.

One method for interconnection of these various components is to manually connect cables between those components which are presently to be used and to manually change the cable connections when it is desired to use other components. One disadvantage of this method is that the cables must be re-arranged each time it is desired to change the system configuration. Moreover, a manual wiring change requires some knowledge of the individual component details, something a child or a guest may not possess.

An alternative to manually rewiring a component video system for changing the system configuration is described in Strammello, Jr. in U.S. Pat. No. 4,400,735 entitled MULTI-COMPONENT VIDEO SYSTEM CONTROLLER. In this system, manually operated pushbutton selectors provide D.C. control voltages to a matrix of electronic RF switches to permit the simultaneous viewing and recording of video signals from various sources in different combinations. Notwithstanding its advantages, the manual RF switching system lacks the facility for interconnecting audio-only devices or baseband video devices. Moreover, overall system control requires operation of the controls of each individual device plus the manual control for the RF switch matrix.

A two-component TV-VCR system featuring RF and baseband switching controlled by a common remote control is described by Kozakai et al. in U.S. Pat. No. 4,527,204 entitled REMOTE CONTROL SYSTEM. The TV receiver and the VCR each include respective remote control receivers for controlling RF and baseband video switching as well as the normal operating modes of the TV and VCR. A single handheld remote control unit controls all operational aspects of both devices as well as selecting desired interconnections. Such a system, however, is not readily adaptable for expansion to include additional components and has no provision for inclusion of audio-only devices in a comprehensive unified home entertainment system.

It has been recognized that a large number of audio/video and audio-only devices may be combined in a unified home entertainment system by providing a central control unit coupled via a digital data bus to individual device of the system. An example of such a system is described in B. W. Beyers, Jr. in U.S. Pat. No. 4,581,645 entitled DISTRIBUTED SWITCHED COMPONENT AUDIO/VIDEO SYSTEM. Other examples include U.S. Pat. No. 4,337,480 of Bourassin et al. entitled DYNAMIC AUDIO-VIDEO INTERCONNECTION SYSTEM and U.S. Pat. No. 4,488,179 of Kruger et al. entitled TELEVISION VIEWING CENTER SYSTEM. R. A. Pitsch describes a bus-oriented system in an article entitled "Dimensia: The Next Dimension of Sight and Sound" published in RCA Engineer, July/August edition, 1985, at pp. 66-70. In the described system the control bus provides two-way communication between a central controller and a plurality of individual device controllers. By this feature a user may transmit a status request and receive a response (displayed on the screen of his TV receiver) that gives the status (e.g., play, pause, etc.) of any selected device in his system. The user may also transmit commands via the two-way data bus to select and control the "status" or operating mode of individual audio and video peripheral devices connected to the bus.

It is known that one may provide timed control of a VCR, for example, by including a clock circuit in the VCR for initiating functions such as recording time periods and channel selection at times determined by the clock. It has been recognized by Brugliera et al. in U.S. Pat. No. 4,631,601 entitled TIME PROGRAMMABLE CONTROL SYSTEM FOR A CONVERTER/VCR SYSTEM that an additional clock is needed for timed operation of a VCR from a cable TV converters. This is because cable converter manually provide an output signal on channel 3 or 4. Accordingly, to change channels at a programmed time an additional clock is necessary for the converter to provide channel selection with the recorder clock being used to select the converter output channel and recording times. In the Brugliera et al. system the extra clock is included in a remote control transmitter which supplies command signals to the cable decoder on a user determined time schedule for controlling the converter time and channel selection operation to correspond to the recording time schedule established for the VCR. Brugliera et al. caution that in their two clock system the user must take care that the clock in the VCR and the converter clock are in agreement. A lack of clock synchronization will result in a spoiled or missed recording.

SUMMARY OF THE INVENTION

The present invention resides in part in the recognition that the prior art method of achieving timed operation of two video devices by providing each with separate clocks is not practical in a combined audio/video system having a plurality of audio and audio-video components. If, for example, the clocks are set manually there is the possibility of human error causing a missed or spoiled recording or some other timed operation. One might consider the possibility of sending periodic updating or synchronizing signals to all clocks in the system but such an approach is relatively complex and costly.

In accordance with the present invention, a master clock is provided in a system control unit which is adapted for connection to a plurality of individual peripheral audio/video devices via a bi-directional data bus. At times determined by the master clock, the system control unit transmits via the bidirectional bus user programmed sequences of commands to user selected peripheral devices for controlling the operating modes thereof. After the transmission of each command of a sequence, the system control unit monitors the control bus for receiving a status message from the selected peripheral device and periodically re-transmits each command for which the received status message is indicative of a wait condition of the selected peripheral device.

In accordance with a further aspect of the invention, the transmission of the command sequence is interrupted without retransmission of commands in response to receipt of one of a plurality of selected status messages.

In accordance with a further feature of the invention the plurality of selected status messages comprises a first group of messages for command sequences containing the command RECORD and a second group of messages for command sequences not containing the command RECORD.

BRIEF DESCRIPTION OF THE DRAWING

The foregoing and further features of the invention are illustrated in the accompanying drawing wherein.

DETAILED DESCRIPTION

Figure 1:
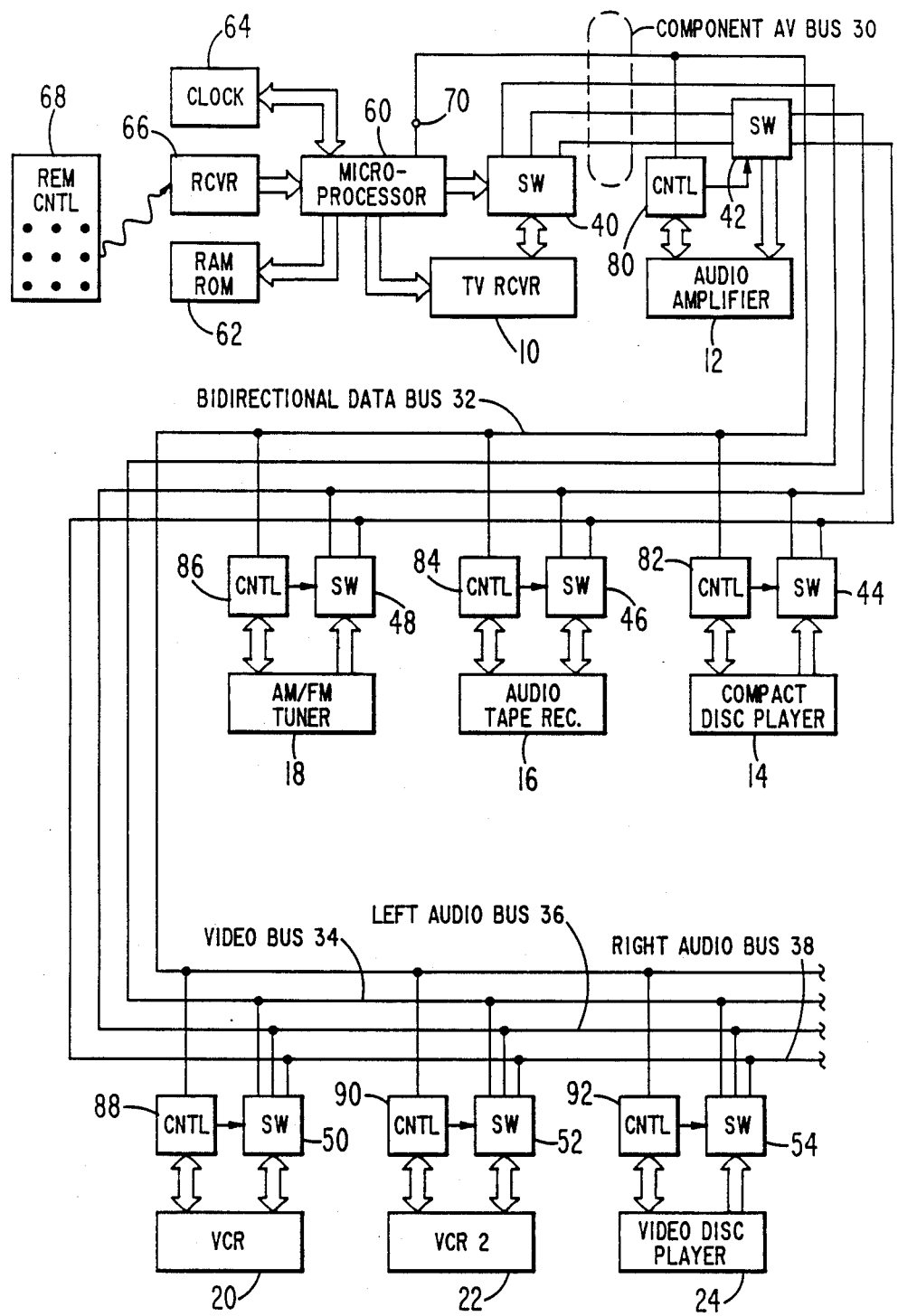
FIG. 1 is a block diagram of a component audio/video system embodying the invention.

The component audio/video system of FIG. 1 includes a television receiver 10, an audio amplifier 12, a compact disc player 14, an audio tape recorder 16, an AM/FM receiver 18, a pair of video cassette recorders 20 and 22 and a video disc player 24. The various devices are coupled together to form a system by means of a component audio/video bus 30 comprised of four individual buses, namely, a bidirectional data bus 32, a video bus 34, a left channel audio bus 36 and a right channel audio bus 38. As described in the aforementioned patent of B. W. Beyers, Jr., (incorporated herein by reference) the use of "daisy chain" type of bus structure as shown advantageously simplifies the addition, deletion or replacement of peripheral devices in the system and avoids the maze of wiring characteristic of systems which employ a central switch matrix (rather than distributed switches) for device coupling. The principles of the present invention apply to bus controlled component system of either type.

The audio and video inputs and outputs of devices 10-24 are coupled to the audio and video bus conductors 34, 36 and 38 by means of switches 40-54 which are controlled as will be explained. Switch 40 provides two-way coupling of audio and video signals to receiver 10 to enable the receiver to act as a signal source for supplying signals to the bus 30 or as a signal receiver or "sink" to receive audio and video signals from the bus. Switches 50 and 52 of VCR 20 and VCR 22 are also "two-way" switches which can coupled audio and video outputs to the bus to act as a signal source device or, alternatively, they couple the VCR inputs to the bus for purposes of recording. An open condition of the switch isolates a non-used device from the bus. Video disc player 24 is coupled to bus 30 by a "one-way" switch 54 since it only has audio and video outputs and thus can serve only as a signal source for the bus. The "audio-only" peripheral devices 14, 16 and 18 are coupled to the audio conductors (36, 38) of bus 30 via one-way switch 44, two way switch 46 and one-way switch 48, respectively. As with the video devices, different switch types are used because, the disc player 14 and tuner 18 can only act as signal sources whereas the audio tape recorder 16 can act as either a signal source or a signal sink. Switch 42 of audio amplifier 12 differs from the other switches in that it is in series with the audio conductors 36 and 38. Switch 42 thus enables the audio bus (36, 38) to be bifurcated or "split" into two portions. This enables audio from TV receiver 10 to be supplied to the inputs of amplifier 12 while allowing other functions (e.g., audio or video duplication) to the performed. As an example, assume that a user wishes to view a TV program, listen to the sound via amplifier 12 and copy a video tape from VCR 20 to VCR 22. For this mode switch 40 would be set to decouple the TV video signal from bus 34 and to coupled the TV audio signals to bus 36 and 38. Switch 42 would be set to couple the audio signals from the TV to the amplifier 12 inputs. This isolates the TV audio signals from the remainder of the audio bus. Finally, switches 50 and 52 would be activated to couple the audio and video output signals of VCR 20 to the inputs of VCR 22. There are a number of such possible switch configurations thereby allowing the user a wide choice of audio and video functions that may be performed simultaneously.

Overall control of switch 40-54 and selection of the operating modes of audio/video devices 10-24 is controlled by a system controller comprising a microprocessor 60 having a memory (RAM, ROM) 62, a master system clock 64 and a remote control receiver 66 coupled thereto. A remote control transmitter 68 is provided for supplying user selected commands to microprocessor 60 via receiver 66. In a presently preferred application of the principles of the invention the microprocessor 60, system clock 64, memory 62 and receiver 66 are physically located within the receiver housing (not shown). Alternatively, these devices may be in a separate module if desired. The memory (RAM and ROM) 62 for microprocessor 60 may be internal to the device. It is shown as being external here for purposes of clarity. Microprocessor 60 is coupled to directly control the operating modes of receiver 10 and switch 40 and includes an input/output port 70 coupled to the bidirectional control bus 32 for controlling the remainder of the peripheral devices 12-24 and bus switches 42-54 in the system. This is facilitated by providing each peripheral device 12-24 with an individual controller 80-92 which, preferably, are also microprocessors or so-called "one-chip" microcomputers.

In operation of the portion of the system described thus far, the user sends device selection and operating mode control command information to system controller 60 by depressing keys on remote control unit 68 which, in turn, transmits the commands to a selected peripheral audio/video device (12-24). The "slave" or remote control processors 80-92 acknowledge receipt of messages from the "master" system controller by transmitting a status message back to the master system controller 60 via the bi-directional data bus 32. R. A. Pitsch in the aforementioned article describes a suitable bus communication protocol. The status information returned via bus 32 may be displayed on the screen of TV receiver 10 for informing the user of the current operating modes of the selected peripheral device.

Figure 2:
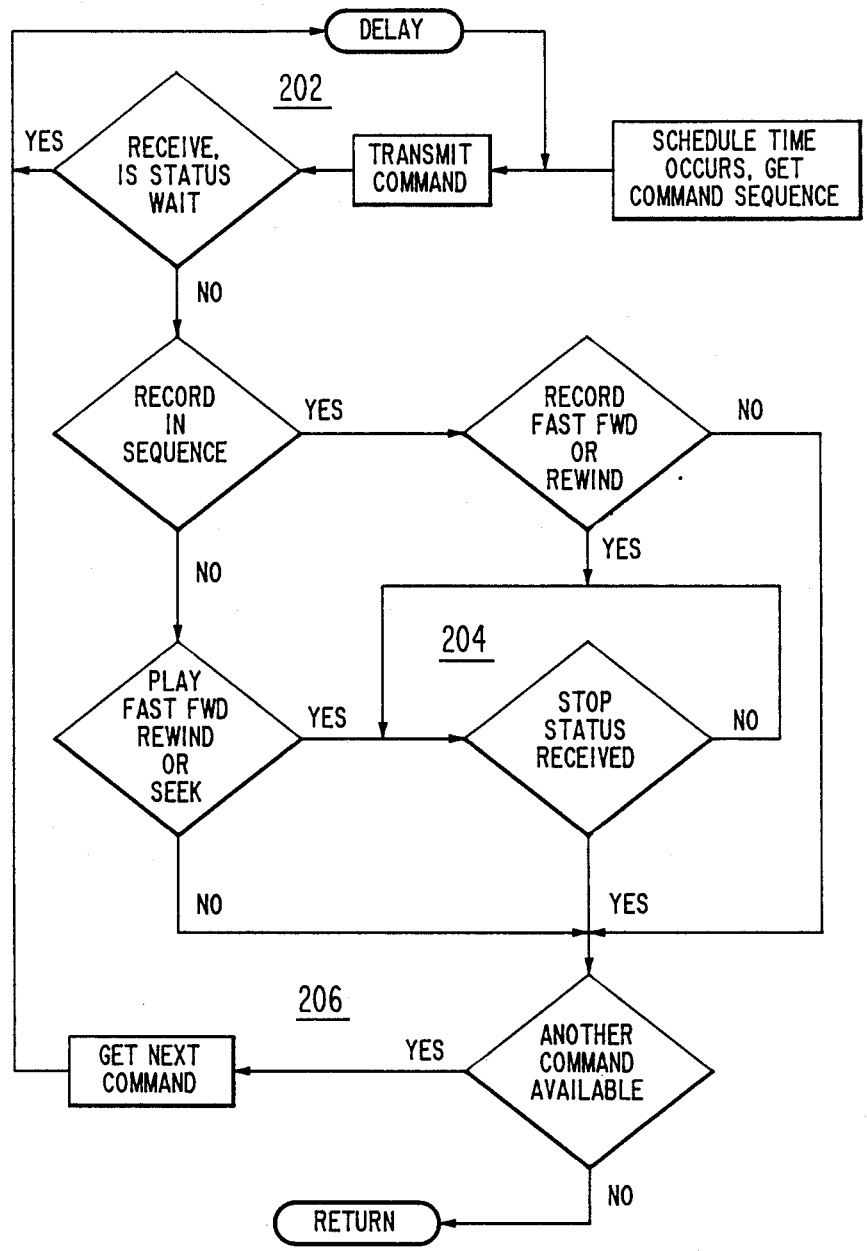
FIG. 2 is a flow chart illustrating operation of the system of FIG. 1 in accordance with the invention.

In accordance with the present invention, the ROM portion of memory 62 (which may be internal to controller 60 as previously noted) includes a program illustrated by the flow chart of FIG. 2. Advantageously, this program enables the system user to send sequences of user specified commands to user specified components at user specified times while eliminating the possibility of a conflict occurring between a given command and a specific operating mode of a peripheral device at the time the command is sent. Moreover, the ability to perform sequences of commands enables the user to operate the system in modes heretofore not possible. As an example, the user may enter a command sequence enabling the recording of a daily broadcast at the same place on a tape by entering a command sequence including a start time, an identification of the program source and recording devices and a command to rewind the recorder before recording. Each new broadcast will be recorded over the previous one. As another example, a number of audio playback devices may be selected for sequential operation to provide hours of sound without any user interaction.

The foregoing features require that all potential conflicts between the operating mode of a selected device and a command be resolved. As an example, a command to play would be missed if it were to be sent to a recorder operating in a rewind mode. In accordance with the invention, the transmission of a sequence of commands is coordinated with the operating modes of the selected device to avoid such potential conflicts.

As an overview, the program flow charted in FIG. 2 avoids such potential conflicts by causing the controller 60 to monitor the bidirectional bus 32 to detect a received return status message from a selected device after the transmission of a command sequence. In response to the received status message the controller 60 selectively (1) retransmits the last command, (2) interrupts the command transmission or (3) transmits a further command of the sequence. In operation, the user stores his desired starting time, device selection and a sequence of device commands in the RAM portion of memory 62 by depressing appropriate keys on remote control unit 68. When the time provided by clock 64 matches the schedule time stored by the user in memory 62 controller 60 fetches the command sequence from ROM and transmits the first command of the sequence. Controller 60 then enters a RECEIVE mode monitoring bidirectional bus 32 for a WAIT status message from the selected peripheral device. The WAIT message signifies that the device is not ready to receive the command, as for example, when a device is first turned on its motor may not be up to speed or its operating voltages may not have stabilized. In this mode no command can be acted upon. If controller 60 detects the presence of a WAIT message, it enters its RETRANSMISSION mode. Specifically, in response to a YES result of the WAIT test controller 60 delays a short time (e.g., a second or so) and retransmits the command (Loop 202).

Upon completion of the WAIT test and RETRANSMISSION mode (if WAIT received), controller 60 next executes a series of tests to determine if the command transmissions should be PAUSED. For example, if the current command is PLAY and the device status is FAST FORWARD then the device must be stopped before changing mode. This PAUSE function interrupts the command transmission until the device stops and is implemented by loop 204 and associated tests. Specifically the PAUSE loop is activated if (1) RECORD is in the command sequence and the current device mode is RECORD, FAST FORWARD or REWIND, or (2) if RECORD is not in the sequence and the current mode is PLAY, FAST FORWARD, REWIND or SEEK. The "seek" mode, illustratively, refers to the mode of a disc player searching for a given band. In the PAUSE mode transmissions are interrupted by the STOP status test which loops (204) until STOP is received. If STOP status is received, or if the previous two tests (1) and (2) are negative, then controller 60 enters its CONTINUE mode (loop 206) for transmitting the next command of the command sequence and the previous tests are repeated until all commands of the sequence have been transmitted at which time the program ends with a return to the main program of controller 60.

What is claimed is:

1. A component audio/video system, comprising:

system controller means having an input/output port connected to a plurality of audio/video components, each for processing at least one of an audio and a video signal, via a bidirectional data bus;

system master clock means coupled to said system controller means for supplying present time information thereto;

keyboard means coupled to said system controller means for supplying, in response to activation by a user, a sequence of device commands and time information for selecting ones of said components for control in various operating modes at future times; and memory means in said system controller means for storing said sequence of device commands and said time information;

said system controller means causing, at said future times to transmit said sequence of device commands stored in said memory means via said bidirectional data bus to said selected ones of said components for controlling said operating modes thereof;

said components each including means for generating a return status message indicating a present operating mode thereof;

said system controller means being responsive subsequent to transmission of a command of said sequence for monitoring said bus for detecting a received return status message from one of said selected components and in response to said status message for selectively (1) re-transmitting the last command, (2) interrupting the command transmission and (3) transmitting a further command in the command sequence.

2. A component audio/video system, comprising:

system controller means having an input/output port connected to a plurality of audio/video components, each for processing at least one of an audio and a video signal, via a bidirectional data bus;

system master clock means coupled to said system controller means for supplying time information thereto;

keyboard means coupled to said system controller means for supplying, in response to activation by a user, a sequence of device commands and time information for selecting ones of said components for control in various operating modes at future times; and memory means in said system controller means for storing said sequence of device commands and said time information;

said system controller means causing, at said future times to transmit said sequence of device commands via said bidirectional data bus to said selected ones of said components for controlling said operating modes thereof;

said components each including means for generating a return status message indicating a present operating mode thereof;

said system controller means being responsive subsequent to transmission of a command of said sequence for monitoring said control bus to receive a status message from one of said selected components and being responsive to a received message indicating a "wait" condition of said one of said selected components for periodically re-transmitting said transmitted command.

3. A component audio/video system as recited in claim 2 wherein said system controller means is responsive to one of a plurality of selected status messages for interrupting the transmission of said sequence of device commands without re-transmitting a command during the period the transmission of the sequence is interrupted.

4. A component audio/video system as recited in claim 3 wherein said plurality of selected status messages comprises a first group of messages for command sequences containing the command RECORD and a second group of messages for command sequences not containing the command RECORD.

* * * * *